United States Patent [19]

Woods

[11] Patent Number: 4,735,737

[45] Date of Patent: Apr. 5, 1988

[54] PROCESS FOR PREVENTING FROST DAMAGE TO PLANTS

[76] Inventor: Della Woods, 7483 Armadillo Way, West Palm Beach, Fla. 33411

[21] Appl. No.: 8,734

[22] Filed: Jan. 30, 1987

[51] Int. Cl.$^4$ ................................................ C09K 3/18
[52] U.S. Cl. ........................................ 252/70; 106/13; 426/568; 47/2
[58] Field of Search ........................... 252/70; 106/13; 426/568; 47/2

[56] References Cited

U.S. PATENT DOCUMENTS

| | | | |
|---|---|---|---|
| 3,712,802 | 1/1973 | Grybek et al. | 252/70 |
| 3,712,803 | 1/1973 | Grybek et al. | 252/70 |
| 4,219,965 | 9/1980 | Freebairn et al. | 47/2 |
| 4,555,417 | 11/1985 | Gibson et al. | 427/361 |
| 4,597,883 | 7/1986 | Lengyel | 252/70 |
| 4,618,442 | 10/1986 | Geary et al. | 252/70 |

FOREIGN PATENT DOCUMENTS

| | | | |
|---|---|---|---|
| 850049 | 8/1970 | Canada | 47/2 |
| 957794A | 2/1981 | U.S.S.R. | 47/2 |

OTHER PUBLICATIONS

Table I, p. 400, Industrial Gums-Polysaccharides and their Derivatives. R. L. Whistler, Editor, Academic Press, 1959.

*Primary Examiner*—Robert Wax
*Assistant Examiner*—R. A. Krasnow
*Attorney, Agent, or Firm*—Scrivener and Clarke

[57] ABSTRACT

An anti-freezing coating material for application to the exposed surfaces of plants subject to freezing. The material consists of a foam composed of a fluid matrix surrounding gas bubbles and having viscosity permitting the foam to be spread by a tool or by spraying onto the plant. A specific foam is a mixture of egg whites and fruit pectin beaten to a stiff foam.

3 Claims, No Drawings

PROCESS FOR PREVENTING FROST DAMAGE TO PLANTS

This invention relates to a process for preventing frost damage to plants and more particularly to an antifreezing coating material which can be applied to surfaces of plants vulnerable to damage by freezing.

When plants, for example, garden plants such as tomatoes, are subject to being severely damaged or even killed by the premature arrival of a killing frost, heretofore the only recourse available to the gardner had been to cover the plants with newspapers in the hope, often vain, that the plant would survive.

Attempts have been made to save large-scale crops, such as orange groves or vegetables grown in sub-tropical portions of the country, against freezing by the use of smudge pots or by spraying some of the crops with water. Smudge pots are not practical for the average homeowner and spraying with water with the expectation that it will freeze on the plants and thus insulate the ice/plant interface against a killing frost substantially less than the freezing temperatures of water, is risky for use by the average homeowner who may not know if his plants can survive the low temperature at which water freezes.

The broad object of the present invention is to provide an anti-freezing coating material for plants wherein the plant/coating interface is maintained above freezing even though the outer layer of the coating may freeze.

Still another object of the invention is to provide an anti-freezing coating material for plants which is easily spread or sprayed onto the vulnerable surfaces of plants yet has a viscosity which increases in the presence of cold temperatures whereby the coating will adhere to the plants with sufficient tenacity to resist being washed off by precipitation falling during the period of freezing cold, but under milder temperature conditions may be washed off by a water spray or rain so as to have no effect on the natural growing cycle of the plant.

Yet another object of the invention is to provide an anti-freezing coating material which is totally nontoxic.

Other objects and their advantages will become apparent as the following detailed description proceeds.

I have discovered that when a densely foamed, viscous material is applied to the surfaces of plants vulnerable to damage by frost, the surfaces are protected against freezing even if the outer layer of the coating freezes. I describe below a coating material which meets the requirements of the invention though the invention is not necessarily restricted to the described coating material so long as it meets the basic requirements as described herein.

The material must be foamed and be capable of being applied by a spreading tool such as a spatula, or by a spray can. Thus the matrix of the foam must be fluid and have a surface tension sufficient to retain bubbles of gas within the foam while the latter is being applied, and after it has been applied for the entire period that subfreezing temperatures exists.

It is within the purview of the invention for the fluid matrix of the foam to be freezable at about the temperature that the plant would freeze. The bubbles in the foam layer contiguous to the plant surface provide an insulation which prevents that layer from freezing. When the outer layer of the foam freezes it would appear to provide ice insulation in the same manner as water sprayed onto plants and allowed to freeze as described above.

It is also within the purview of the invention that the fluid matrix of the foam be such that its viscosity increases as the temperature falls and decreases as it rises. The increased viscosity causes the foamed layer to cling to the coated surface with a tenacity that increases as the temperature falls whereby the material resists being prematurely washed away by precipitation, such as sleet or freezing rain, falling during the period of killing frost.

Though the coating material must resist being washed away during freezing conditions, it nevertheless must be capable of being readily washed away by a water spray or by rain when the temperature rises above the danger level.

An example of a coating material which meets all of the above requirements comprises egg whites and fruit pectin mixed together in a proportion of about three parts of egg white to about one part of fruit pectin, the latter being preferably apple pectin. The mixture is then beaten to a stiff foam after which it may be applied to the vulnerable surface of plants.

Under freezing weather conditions, it was discovered that the surface of foam material exposed to ambient conditions froze but the layer of material contiguous to the surface of the plant did not freeze but rather stayed soft, pliant and slippery thereby indicating that the layer of material in that region remained above freezing, and in like manner so did the surface covered thereby.

To summarize, the invention comprises an anti-freezing coating material to be applied to the vulnerable surfaces of plants consisting of a fluid foam matrix surrounding gas bubbles with the matrix having a surface tension sufficient to preserve its foamed state throughout its period of use. The foam desirably has a viscosity which varies with temperature whereby it clings to the surface during low temperature periods but may be washed away during high temperature periods. Further, the foam desirably has a freezing point at about the same level as the freezing point of the fluid in a plant to which the foam may be applied, that is to say, about the freezing point of water whereby the outer layer of the foam coating may freeze and provide further insulation for the layer of material touching the plant surface. Lastly, the invention can comprise the foam material specifically described as composed of a foam mixture of egg whites and fruit pectin.

Though the invention may have particular value to homeowners for preferably spray treating their plants with foam, the invention is not restricted to such use but may also be used in the large scale treatment of crops through the use of industrial sprayers of suitable capacity.

It will be apparent that the invention is susceptible of a range of modifications and changes without, however, departing from the scope and spirit of the appended claims.

I claim:

1. A process for protecting plants against freezing comprising the step of applying a material consisting essentially of a fluid matrix surrounding bubbles of gas, the fluid matrix having a surface tension sufficient to retain the bubbles of gas within the foam as the latter is applied to the surface of a plant and after it has been applied for the entire period that subfreezing temperatures exist, said fluid matrix having a freezing point at about the freezing point of fluid in plants to which said material may be applied, said matrix comprising a mixture of egg whites and fruit pectin beaten into a foam having a viscosity which varies with temperature, the viscosity increasing as the temperature falls and vice versa when the temperature rises.

2. The process of claim 1, wherein the matrix comprises about three parts of egg whites to about one part of fruit pectin.

3. The process of claim 1, wherein the fruit pectin is apple pectin.

* * * * *